United States Patent
Doushita et al.

(10) Patent No.: US 6,936,338 B2
(45) Date of Patent: Aug. 30, 2005

(54) MAGNETIC RECORDING TAPE

(75) Inventors: Hiroaki Doushita, Kanagawa (JP); Noriko Inoue, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/448,347

(22) Filed: May 30, 2003

(65) Prior Publication Data
US 2003/0228493 A1 Dec. 11, 2003

(30) Foreign Application Priority Data
May 30, 2002 (JP) ..................................... P.2002-157513

(51) Int. Cl.$^7$ ............................................... G11B 5/735
(52) U.S. Cl. ...................... 428/212; 428/323; 428/328; 428/329; 428/336; 428/694 BB
(58) Field of Search ................................. 428/323, 328, 428/329, 336, 694 BB, 212

(56) References Cited

U.S. PATENT DOCUMENTS

| | | | |
|---|---|---|---|
| 5,532,042 A | 7/1996 | Kawarai et al. | |
| 5,705,253 A | * 1/1998 | Berg et al. | ................... 428/141 |
| 6,346,310 B1 | 2/2002 | Naoe et al. | |
| 2002/0028352 A1 | 3/2002 | Kato et al. | |

FOREIGN PATENT DOCUMENTS

| | | |
|---|---|---|
| JP | 4-71244 B | 11/1992 |
| JP | 2001-222811 A | 8/2001 |
| JP | 2001-229521 A | 8/2001 |
| JP | 2001-325716 | * 11/2001 |
| WO | WO-99/38158 | * 7/1999 |

* cited by examiner

*Primary Examiner*—Stevan A. Resan
(74) *Attorney, Agent, or Firm*—Sughrue Mion, PLLC

(57) ABSTRACT

A magnetic recording tape comprising: a magnetic layer comprising a ferromagnetic powder and a binder; a non-magnetic layer; a support; and a back coating layer, in this order, wherein the magnetic layer has a surface lubricant index of from 1.3 to 3.5, the back coating layer comprises titanium oxide, α-iron oxide or a mixture thereof as an inorganic oxide powder and carbon black and further comprises from 10 to 30 parts by weight, based on 100 parts by weight of a total amount of the inorganic oxide powder and the carbon black, of a binder, and the back coating layer has a surface lubricant index of from 1.10 to 3.0.

14 Claims, No Drawings

MAGNETIC RECORDING TAPE

FIELD OF THE INVENTION

The present invention relates to a high density magnetic recording tape having excellent electromagnetic conversion characteristics and running durability.

BACKGROUND OF THE INVENTION

Hitherto, magnetic heads with electromagnetic induction being an operating principle (induction type magnetic heads) have been used and diffused. However, in using them in a higher density recording/reproduction region, limits initiate to be seen. Then, reproducing heads with magnetic resistance (MR) being an operating principle are proposed and initiate to be used in hard discs, etc. The MR heads provide a reproducing output of several times higher than the induction type magnetic heads. Further, since the MR heads do not use an induction coil, they lower an instrumental noise such as impedance noise and reduce a noise of the magnetic recording media, thereby enabling to obtain a high S/N ratio. In conventionally used coating type magnetic recording media that have excellent productivity and can be provided at a low cost, magnetic recording layers suited for MR heads are being investigated. Magnetic recording media comprising a nonmagnetic support having thereon a substantially nonmagnetic lower layer and a magnetic layer having a ferromagnetic fine powder dispersed in a binder in that order are able to make the magnetic layer thin while keeping the surface smoothness and hence, are frequently applied at present in high density coating type magnetic recording media (see JP-B-4-71244).

In order to realize high density recording, it is important to make the particle size of the magnetic powder smaller. However, for example, in developing coating type magnetic recording media having an areal recording density exceeding 0.3 Gbit/inch$^2$, there has been especially revealed a problem such that the smaller the particle size of magnetic particles, the larger the noise is. When the particle size of magnetic powders is made small, it becomes difficult to disperse the magnetic powders in a binder during preparation of a coating material for magnetic layer, and it becomes impossible to keep the surface smoothness of the magnetic layer. As a result, it becomes difficult to obtain desired low noise media. For suppressing the noise, it is necessary that (1) coagulation of magnetic materials be dissolved and (2) the surface of the magnetic layer be made smooth.

Magnetic recording tapes are required to have good running durability in addition to excellent electromagnetic conversion characteristics. For achieving this, there are made attempts to improve the running durability by, for example, providing a back coating layer and proving protrusions on the base surface or adding coarse particulate carbon having a particle size of 0.1 μm or more to the back coating layer to roughen the surface. In the case where the surface of a back coating layer is roughened by such a method, there was a defect of causing so-called "reverse taking" such that when a magnetic recording tape is wound up around a hub and stored or treated, the back coating layer comes into press contact with a magnetic layer, whereby unevennesses of the back coating layer are taken into the magnetic layer, resulting in a reduction of the electromagnetic conversion characteristics. For dissolving such a "reverse taking" problem, there is made an attempt to smoothen the surface of the back coating layer.

For example, JP-A-10-116414 proposes to use a back coating layer containing carbon black as primary particles or aggregates having a diameter larger than the long axis length of a metal magnetic powder and having a surface smoothness of not more than 0.01 μm in terms of center line average roughness. In this case, it is possible to suppress an increase in noise during winding and storage. However, such an effect is not useful in the case where reverse taking has already occurred at the time of preparation of the tape. Further, this patent document does not describe at all durability of the back coating layer. When the surface of the back coating layer is smoothened, a friction coefficient against guides of reproducing units such as VTR increases, leading to reduction of running stability.

The presence state of a lubricant on the medium surface greatly contributes to the running durability. For example, JP-A-2001-222811, JP-A-2001-229521 and JP-A-2001-325716 propose to improve the running property by setting up an amount of a lubricant on the surface and surface hardness in the magnetic layer side within specific ranges. However, in these patent documents, such proposals are limited to the magnetic layer regardless of magnetic disc-like media or tape media. The patent documents do not describe durability of back coating layer at all.

JP-A-11-259851 proposes a back coating layer of a high adhesion strength, containing particulate oxides of titanium oxide, α-iron oxide or a mixture thereof and carbon black and further from 10 to 40 parts by weight, based on 100 parts by weight of the total weight of the particulate oxides and carbon black, of a binder. In this case, the patent document describes that it is possible to improve the output and keep the running durability. However, the whole of the system as disclosed is of a system of induction type magnetic head that is relatively insensitive to noise, and the patent document does not describe influence against the noise in the magnetic layer side. Accordingly, we cannot stop saying that improvements are necessary as a coating type magnetic recording medium having an areal recording density exceeding 0.3 Gbit/inch$^2$.

On the other hand, a demand of realization of thin layers extends over not only magnetic layers but also the whole of layers constituting a magnetic recording tape. In recent years, media for computer storage are required to have high capacity and make the thickness of the whole of a tape thin. For making the thickness of magnetic recording tapes thin, there have hitherto been employed a method of making a flexible support thin and a method of making a nonmagnetic layer between a flexible support and a magnetic layer of a coating type magnetic recording tape thin. However, there were involved defects such that when the flexible support is made thin to less than a certain range, the running durability is lowered and that when the nonmagnetic layer is made thin, reduction in output, increase in error rate, or increase in drop-out likely occurs. A back coating layer cannot be omitted for the purpose of keeping the running property good. Further, when the back coating layer is made thin, since adhesion strength between a nonmagnetic layer and a support is lowered, the back coating layer likely peels away during repeated running, or protrusions on the surface of the back coating layer cause reverse taking into a magnetic layer, leading to reduction in output.

As described above, the conventional technologies have not yet provided magnetic recording tapes that are sufficiently good in both electromagnetic conversion characteristics and running durability. Especially, in these days when the thickness of the whole of magnetic recording tape is required to be made thin, nevertheless magnetic recording tapes containing a thin back coating layer and having good electromagnetic conversion characteristics and running durability are required, satisfactory magnetic recording tapes have not been provided yet.

SUMMARY OF THE INVENTION

An object of the invention is to provide a magnetic recording tape that solves the problems of the conventional technologies, is low in noise, has a high capacity, contains a thin back coating layer, has good running durability, and is suitable for MR heads.

In order to attain the foregoing object, the present inventors made extensive and intensive investigations. As a result, the object has been attained by a magnetic recording tape comprising a support having thereon a magnetic layer composed mainly of a ferromagnetic powder and a binder and having a nonmagnetic layer between the magnetic layer and the support and a back coating layer on the opposite surface thereof, wherein the magnetic layer has a surface lubricant index of from 1.3 to 3.5; the back coating layer contains titanium oxide, α-iron oxide or a mixture thereof as an inorganic oxide powder and carbon black and further contains from 10 to 30 parts by weight, based on 100 parts by weight of the total amount of the inorganic oxide powder and carbon black, of a binder; and the back coating layer has a surface lubricant index of from 1.10 to 3.0. Further, it is preferred that the back coating layer has a thickness of from 0.2 to 0.8 μm.

DETAILED DESCRIPTION OF THE INVENTION

In the invention, both the electromagnetic conversion characteristics and the running durability can be attained by setting up a value on each of the surfaces of the magnetic layer and the back coating layer as determined by the method described in the Examples, which will be an index of lubricant amount present in the vicinity of the surface, within the above-described range and specifying the composition of back coating layer.

In the invention, the magnetic layer has a surface lubricant index of from 1.3 to 3.5, and preferably from 1.35 to 2.0. This surface lubricant index can be adjusted by choosing the binder component, powder component and lubricant component of the magnetic layer and choosing compounding amounts thereof. Though these components can be chosen from conventionally known materials, those described later in the composition of back coating layer can also be properly used.

The lubricant to be contained in the magnetic layer is in general used in an amount of from 1 to 8 parts by weight, and preferably from 2 to 5 parts by weight based on 100 parts by weight of the ferromagnetic powder.

The magnetic recording tape of the invention includes a wide variety of magnetic recording tapes having a magnetic layer on one surface of a flexible support and a back coating layer on the opposite surface thereof. Accordingly, the magnetic recording tape of the invention also includes those having other layers than a magnetic layer and a back coating layer. Examples of these other layers include a nonmagnetic layer containing a nonmagnetic powder, a soft magnetic layer containing a soft magnetic powder, a second magnetic layer, a cushioning layer, an overcoat layer, an adhesive layer, and a protective layer. These layers can be provided in proper positions such that functions thereof can effectively exhibit. As the magnetic recording tape of the invention, magnetic recording tapes having a nonmagnetic layer containing a nonmagnetic inorganic powder and a binder between a flexible support and a magnetic layer are preferable. With respect to the thickness of layers, for example, the magnetic layer has a thickness of from 0.03 to 1 μm, and the nonmagnetic layer has a thickness of from 0.5 to 3 μm. Preferably, the thickness of the nonmagnetic layer is thicker than that of the magnetic layer. Further, in the case where a soft magnetic layer is present between a flexible support and a magnetic layer, for example, the magnetic layer has a thickness of from 0.03 to 1 μm, and preferably from 0.05 to 0.5 μm, and the soft magnetic layer has a thickness of from 0.8 to 3 μm.

In the back coating layer of the magnetic recording tape of the invention, titanium oxide, α-iron oxide or a mixture thereof as an inorganic oxide powder and carbon black are used. It is preferred to use any one of titanium oxide, α-iron oxide or a mixture thereof as the inorganic oxide powder. As titanium oxide and α-iron oxide, those that are usually used can be used. Further, the shape of particles is not particularly limited. In the case where particulate titanium oxide or α-iron oxide is used, those having a particle size of from 0.01 to 0.1 μm are preferred from the standpoint of ensuring the film strength of the back coating layer itself. Further, in the case where acicular titanium oxide or α-iron oxide is used, an acicular ratio is preferably from 2 to 20, and more preferably from 3 to 10. Moreover, preferably, a long axis length is from 0.05 to 0.3 μm, and a short axis length is from 0.01 to 0.05 μm. At least a part of the surface of the inorganic oxide powder may be modified by or coated with another compound. Especially, inorganic oxide powders in which at least a part of the surface thereof is coated with at least one compound selected from $Al_2O_3$, $SiO_2$, $TiO_2$, $ZrO_2$, $SnO_2$, $Sb_2O_3$ and $ZnO_2$, and preferably at least one compound selected from $Al_2O_3$, $SiO_2$ and $ZrO_2$ are preferable because they are excellent in dispersibility into a binder. Such inorganic oxide powders can be obtained by synthesizing particles of titanium oxide or α-iron oxide and then treating them such that another compound is deposited or coated on the surfaces thereof; or co-precipitating titanium oxide or α-iron oxide and at least one compound selected from $Al_2O_3$, $SiO_2$, $TiO_2$, $ZrO_2$, $SnO_2$, $Sb_2O_3$ and $ZnO_2$.

Such inorganic oxide powders are commercially available. Examples include DPN-245, DPN-250, DPN-250BX, DPN-270BX, DPN-550BX, DBN-550RX, TF-100 and TF-120 (manufactured by Toda Kogyo Corp.); TTO-51A, TTO-51B, TTO-51C, TTO-53B, TTO-55A, TTO-55B, TTO-55C, TTO-55D, TTO-55N, TTO-55S, TTO-S-1, TTO-S-2, TTO-M-1, TTO-M-2, TTO-D-1, TTO-D-2, SN-100, E270 and E271 (manufactured Ishihara Sangyo Kaisha, Ltd.); STT-4D, STT-30D, STT-30 and STT-65C (manufactured by Titan Kogyo Kabushiki Kaisha); MT-100F, MT-100S, MT-100T, MT-150W, MT-500B, MT-500HD and MT-600B (manufactured by Tayca Corporation); $TiO_2$ P25 (manufactured by Nippon Aerosil co., Ltd.); and Supertitania (manufactured by Show Denko K.K.).

For preventing electrification, it is preferred to use carbon black in the back coating layer. A wide variety of carbon blacks that are in general used in magnetic recording media can be used as the carbon black to be used in the back coating layer. Examples include furnace black for rubber, thermal black for rubber, carbon black for coloring, and acetylene black. For preventing reverse taking of unevennesses of the back coating layer into the magnetic layer, the carbon black preferably has a particle size of not more than 0.3 μm. Here, the particle size as referred to herein means a particle size of single particle free from agglomeration. The particle size is especially preferably from 0.01 to 0.1 μm.

The carbon black preferably has a pH of from 2 to 10, a water content of from 0.1 to 10%, and a tap density of from 0.1 to 1 g/mL. The carbon black has a specific surface area of from 100 to 500 $m^2/g$, and preferably from 150 to 400 $m^2/g$ and a DBP oil absorption of from 20 to 400 mL/100 g, and preferably from 30 to 200 mL/100 g. Specific examples include BLACK PEARL S2000, BLACK PEARL S1300, BLACK PEARL S1000, BLACK PEARL S900, BLACK PEARL S800, BLACK PEARL S880, BLACK PEARL S700 and VULCAN XC-72 (manufactured by Cabot Corporation); #3050B, #3150B, #3250B, #3750B, #3950B, #950, #650B, #970B, #850B and MA-600 (manufactured by Mitsubishi Chemical Corporation); CONDUCTEX SC, RAVEN 8800, RAVEN 8000, RAVEN 7000, RAVEN 5750, RAVEN 5250, RAVEN 3500, RAVEN 2100, RAVEN 2000, RAVEN 1800, RAVEN 1500, RAVEN 1255 and RAVEN 1250 (manufactured by Columbia Carbon Company); Ketjen Black EC (manufactured by Akzo Nobel); #55, #50 and #35 (manufactured by Asahi Carbon Co., Ltd.); RAVEN 450 and RAVEN 430 (manufactured by Columbia Carbon Company); and Thermax MT (manufactured by Cancarb Limited).

A weight ratio of the inorganic oxide powder to the carbon black is preferably from 60/40 to 90/10, and more preferably from 70/30 to 80/20. By containing the inorganic oxide powder in an amount higher than that of the carbon black, it is possible to form a back coating layer having good dispersibility of powders and having a smooth surface. Further, for reducing reverse taking, it is preferred that a height of protrusions from the surface of the back coating layer is not more than 30 nm. The compounding ratio, kind and size of the inorganic oxide powder and carbon black are selected. It is preferred that such protrusions are formed mainly of carbon black. A back coating layer-forming coating material having such a composition has high thixotropy as compared with the conventional back coating layer-forming coating materials composed mainly of carbon black. For this reason, it is possible to undergo coating (such as extrusion mode and gravure mode) in a high concentration. By coating such a high-concentration coating material, nevertheless the film thickness is thin, it is possible to form a back coating layer having a high adhesion strength to a support and a high mechanical strength. Further, by using a high-concentration back coating layer-forming coating material, even when an undercoating layer composed mainly of a low-molecular weight polyester is formed between a back coating layer and a support, it is possible to control leaching of the low-molecular polyester onto the surface of the back coating layer. For this reason, it is effective to avoid sticking and running failure due to leaching, which have hitherto been considered problematic in the case of forming an undercoating layer. Accordingly, by forming an adhesive undercoating layer, it becomes easy to regulate the adhesion strength between the back coating layer and the support within a desired range. However, it is not always necessary to form an undercoating layer. By using vinyl chloride resins or urethane resins as a binder of the back coating layer-forming coating material while adjusting a ratio thereof and using mainly cyclohexanone as a solvent, it is also possible to reduce a difference in interfacial energy between the back coating layer and the flexible support and increase adhesion strength. In the invention, the adhesion strength between the support and the back coating layer can be regulated within a desired range by properly selecting or combining these means. By using a back coating layer-forming coating material containing such an inorganic oxide powder in an amount larger than carbon black, it is possible to reduce an amount of a binder to be used because adsorption property of the inorganic oxide powder to the binder is good. The amount of the binder to be used is preferably selected from the range of from 10 to 30 parts by weight, and more preferably from 20 to 28 parts by weight based on 100 parts by weight of the total weight of the inorganic oxide powder and the carbon black. The thus formed back coating layer has a high film strength and low surface electrical resistance. Since the magnetic recording tape of the invention has a back coating layer having such excellent functions, it is excellent in running durability and magnetic conversion characteristics as compared with the conventional products.

In the invention, examples of binders for back coating layer include conventionally known thermoplastic resins, thermosetting resins, and reactive resins. Preferred examples of binders include vinyl chloride resins, vinyl chloride-vinyl acetate resins, cellulose based resins such as nitrocellulose, phenoxy resins, and polyurethane resins. Of these, vinyl chloride resins, vinyl chloride-vinyl acetate resins, and polyurethane resins are more preferable because they can make a hardness of the back coating layer closed to that of the magnetic layer to reduce reserve taking.

The polyurethane resin preferably contains at least one polar group selected from $-SO_3M$, $-OSO_3M$, $-COOM$, $-PO_3MM'$, $-OPO_3MM'$, $-NRR'$, and $-N^+RR'RR''COO^-$ (wherein M and M' each independently represents a hydrogen atom, an alkali metal atom, an alkaline earth metal atom, or an ammonium group; R and R' each independently represents an alkyl group having from 1 to 12 carbon atoms; and R'' represents an N-bonding alkylene group having from 1 to 12 carbon atoms), and particularly preferably $-SO_3M$ and $-OSO_3M$ in the molecule thereof. An amount of such a polar group is preferably from $1\times10^{-5}$ to $2\times10^{-4}$ eq/g, and particularly preferably from $5\times10^{-5}$ to $1\times10^{-4}$ eq/g. When the amount of the polar group is less than $1\times10^{-5}$ eq/g, since adsorption to the powder is insufficient, dispersibility is liable to lower, whereas when it exceeds $2\times10^{-4}$ eq/g, since solubility in a solvent tends to lower, dispersibility is liable to lower, too.

The polyurethane resin preferably has a number average molecular weight (Mn) of from 5,000 to 100,000, more preferably from 10,000 to 50,000, and particularly preferably from 20,000 to 40,000. When the number average molecular weight of the polyurethane resin is less than 5,000, strength and durability of the coating film are low. On the other hand, when it exceeds 100,000, solubility in a solvent and dispersibility are low. The cyclic structure of the polyurethane resin contributes to rigidity, and the ether group thereof contributes to flexibility.

The back coating layer of the magnetic recording tape of the invention can properly contain other components than the inorganic oxide powder, carbon black and binder. Preferably, the back coating layer contains a lubricant. Examples of lubricants include fatty acids, fatty acid esters, and fatty acid amides. Especially, what a fatty acid is contained is essential for suppressing an increase of friction coefficient during repeated running while keeping the strength. Further, by containing a fatty acid ester or an abrasive having a Mohs' hardness of 8 or more, it is possible to suppress an increase of friction coefficient and to enhance sliding durability during repeated running. In addition, it is also possible to suppress an increase of friction coefficient by containing an aromatic organic acid compound or a titanium coupling agent, thereby enhancing dispersibility and increasing strength. Moreover, it is possible to suppress an increase of friction coefficient and reduce reverse taking by containing an organic powder. Examples of fatty acids that can be added include monobasic fatty acids having from 8 to 24 carbon atoms. Of these are preferable monobasic fatty acids having from 8 to 18 carbon atoms. Specific examples include lauric acid, caprylic acid, myristic acid, palmitic acid, stearic acid, behenic acid, oleic acid, linoleic acid, linolenic acid, and elaidic acid. Further, amides of these fatty acids can be used.

Examples of fatty acid esters include mono-fatty acid esters, di-fatty acid esters or tri-fatty acid esters comprising a monobasic fatty acid having from 10 to 24 carbon atoms (which may contain an unsaturated bond or may be branched) and any one of mono-, di-, tri-, tetra-, penta- or hexahydric alcohols having from 2 to 12 carbon atoms (which may contain an unsaturated bond or may be branched). Specific examples of such fatty acid esters include butyl stearate, octyl stearate, amyl stearate, isooctyl stearate, octyl myristate, butoxyethyl stearate, anhydrosorbitan mono-stearate, anhydrosorbitan distearate, and anhydrosorbitan tristearate.

The addition amount of the lubricant is preferably from 0.1 to 5 parts by weight, and more preferably from 0.1 to 3 parts by weight based on 100 parts by weight of the total amount of the inorganic oxide powder and carbon black. Preferably, the lubricant is added such that the surface lubricant index is from 1.10 to 3.0, and preferably from 1.10 to 2.0.

Examples of abrasives having a Mohs' hardness of 8 or more include α-alumina, chromium oxide, artificial diamond, and carbon-modified boron nitride (CBN). Especially, those having a mean particle size of not more than 0.2 μm and a particle size lower than the thickness of the back coating layer are preferable. In the invention, since the back coating layer can be made thin, it is possible to ensure sufficient sliding durability merely by adding a small amount of an abrasive. As the aromatic organic acid compound, phenylphosphonic acid is preferable. Its amount is from 0.03 to 10 parts by weight, and preferably from 0.5 to 5 parts by weight based on 100 parts by weight of the total amount of the inorganic oxide powder and the carbon black.

Examples of organic powders include acrylic styrene copolymer based resin powders, benzoguanamine resin powders, melamine based resin powders, and phthalocyanine based pigments.

The back coating layer preferably has a glass transition temperature of from 60 to 120° C. and generally has a thickness after drying of from about 0.05 to 1.0 μm.

Even when the magnetic recording tape of the invention is wound up at a high tension and preserved, since the back coating layer hardly causes reverse taking into the magnetic layer, it is possible to make the tape have a thickness of from 4 to 9 μm.

The ferromagnetic powder that is used in the magnetic layer of the magnetic recording tape of the invention is a ferromagnetic metal powder or a barium ferrite powder. The ferromagnetic powder usually has an $S_{BET}$ (BET specific surface area) of from 40 to 80 m$^2$/g, and preferably from 50 to 70 m$^2$/g. Further, the ferromagnetic powder usually has a crystallite size of from 10 to 25 nm, and preferably from 11 to 22 nm. Moreover, the ferromagnetic powder usually has a long axis length of from 0.03 to 0.25 μm, and preferably from 0.04 to 0.08 μm. The ferromagnetic powder preferably has a pH of 7 or more. Examples of ferromagnetic metal powders include single metals or alloys thereof such as Fe, Ni, Fe—Co, Fe—Ni, Co—Ni, and Co—Ni—Fe. The ferromagnetic metal powder may contain aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, bismuth, etc. in an amount of not more than 20% by weight of the metal component. Further, the ferromagnetic metal powder may contain a small amount of water, a hydroxide or an oxide. Preparation of these ferromagnetic powders is already known, and the ferromagnetic powder to be used in the invention can be prepared according known methods. Though the shape of the ferromagnetic powder is not particularly limited, those having an acicular, particulate, die-like, rice grain-like, or tabular shape can be used. Especially, it is preferred to use acicular ferromagnetic powders.

In the invention, a binder, a curing agent and a ferromagnetic powder are kneaded and dispersed together with a solvent that is usually used during preparation of magnetic coating materials, such as methyl ethyl ketone, dioxane, cyclohexanone, and ethyl acetate, to prepare a magnetic layer-forming coating material. Kneading and dispersing can be carried out in a usual manner. The magnetic layer-forming coating material may contain additives or fillers that are usually used, such as abrasives (such as α-Al$_2$O$_3$ and Cr$_2$O$_3$), antistatics (such as carbon black), lubricants (such as fatty acids, fatty acid esters, and silicone oil), and dispersants, in addition to the above-described components.

Next, a lower nonmagnetic layer or a lower magnetic layer present in the case where the invention has a multi-layered construction will be hereunder described (hereinafter, the lower nonmagnetic layer or lower magnetic layer will be sometimes referred to as "lower layer"). Inorganic powders that are used in the lower layer of the invention are irrespective of magnetic powders or nonmagnetic powders. For example, in the case of nonmagnetic powders, inorganic powders can be selected from inorganic compounds or nonmagnetic metals such as metal oxides, metal carbonates, metal sulfates, metal nitrides, metal carbides, and metal sulfides. Examples of inorganic compounds include titanium oxides (such as TiO$_2$ and TiO), α-alumina having an α-conversion of from 90 to 100%, β-alumina, γ-alumina, α-iron oxide, chromium oxide, zinc oxide, tin oxide, tungsten oxide, vanadium oxide, silicon carbide, cerium oxide, corundum, silicon nitride, titanium carbide, silicon dioxide, magnesium oxide, zirconium oxide, boron nitride, calcium carbonate, calcium sulfate, barium sulfate, molybdenum disulfide, goethite, and aluminum hydroxide. These inorganic compounds may be used alone or in combination. Of these, titanium dioxide, zinc oxide, iron oxide, and barium sulfate are particularly preferred, and the titanium dioxide as described in JP-A-5-182177 and the α-iron oxide as described in JP-A-6-60362 and JP-A-9-170003 are further preferable. Examples of nonmagnetic metals include Cu, Ti, Zn, and Al. These nonmagnetic powders preferably have a mean particle size of from 0.005 to 2 μm. If desired, it is possible to have the same effects by combining nonmagnetic powders having a different mean particle size or by broadening the particle size distribution of even a single nonmagnetic powder. Nonmagnetic powders having a mean particle size of from 0.01 μm to 0.2 μm are especially preferred. The nonmagnetic powder particularly preferably has a pH of from 6 to 9. The nonmagnetic powder has a specific surface area of from 1 to 100 m$^2$/g, preferably from 5 to 50 m$^2$/g, and more preferably from 7 to 40 m$^2$/g. The nonmagnetic powder preferably has a crystallite size of from 0.01 μm to 2 μm. The nonmagnetic powder has an oil absorption using DBP of from 5 to 100 mL/100 g, preferably from 10 to 80 mL/100 g, and more preferably from 20 to 60 mL/100 g. The nonmagnetic powder has a specific gravity of from 1 to 12, and preferably from 3 to 6. The shape may be any of acicular, spherical, polyhedral, or tabular shape.

Examples of soft magnetic powders include particulate Fe, Ni, particulate magnetite, Fe—Si, Fe—Al, Fe—Ni, Fe—Co, Fe—Co—Ni, Fe—Al—Co (sendust) alloys, Mn—Zn ferrite, Ni—Zn ferrite, Mg—Zn ferrite, Mg—Mn ferrite, and those described in Soshin Chikazume, *Physics of Ferromagnetic Materials (the last volume)—Magnetic Characteristics and Applications*, published by Shokabo (1984), pp. 368-376. It is preferred that these nonmagnetic powders and soft magnetic powders are subjected to surface treatment such that at least a part of the surface thereof is coated with $Al_2O_3$, $SiO_2$, $TiO_2$, $ZrO_2$, $SnO_2$, $Sb_2O_3$, or ZnO. Especially, $Al_2O_3$, $SiO_2$, $TiO_2$ and $ZrO_2$ give good dispersibility, with $Al_2O_3$, $SiO_2$ and $ZrO_2$ being further preferred. These compounds may be used in combination or singly. Further, co-precipitated surface treated layers may be used, or a method in which the surface is first treated so as to be coated with alumina and then treated so as to be coated with silica or a reverse method thereto may be employed according to the purpose. Moreover, though the surface treated layer may be a porous layer according to the purpose, it is generally preferable that the surface is uniform and minute.

By mixing carbon black in the lower layer, it is possible to reduce a surface electrical resistance (Rs) and obtain a desired micro Vickers' hardness. The carbon black generally has a mean particle size (arithmetic mean value of particle sizes) of from 5 nm to 80 nm, preferably from 10 nm to 50 nm, and more preferably from 10 nm to 40 nm. Concretely, the same carbon black that can be used in the back coating layer can be used. Further, magnetic powders can be used as inorganic powders in the lower layer of the invention. Examples of magnetic powders include $\gamma$-$Fe_2O_3$, Co-modified $\gamma$-$Fe_2O_3$, alloys composed mainly of $\alpha$-Fe, and $CrO_2$. The magnetic material of the lower layer can be selected according to the purpose, and the effects of the invention do not rely on the kind of magnetic material. However, according to the purpose, it is known to change performance between the upper and lower layers. For example, for enhancing long-wavelength recording characteristics, it is desired that Hc of the lower magnetic layer is set up lower than Hc of the upper magnetic layer, and it is effective that Br of the lower magnetic layer is made higher than Br of the upper magnetic layer. Besides, advantages as brought by employing known multilayered constructions can be imparted. As binders, lubricants, dispersants, additives, solvents, dispersing methods, and others for the lower magnetic layer or lower nonmagnetic layer, those described above for the magnetic layer can be applied. Especially, with respect to the amount and kind of binders, the amount and kind of additives, and the amount and kind of dispersants, known technologies regarding magnetic layers can be applied.

Examples of flexible supports that can be used in the invention include biaxially stretched polyethylene naphthalate (PEN), polyethylene terephthalate (PET), polyamides, polyimides, polyamide-imides, aromatic polyamides, and poly(p-phenylene-benzobisoxazole). These nonmagnetic supports may be previously subjected to corona discharge, plasma treatment, easy adhesion treatment, or thermal treatment. It is preferred that the nonmagnetic support that can be used in the invention has excellent surface smoothness such that its center line average surface roughness is in general in the range of from 0.1 to 20 nm, and preferably from 1 to 10 nm at a cutoff value of 0.25 mm. Further, it is preferred that not only the magnetic support has a small center line average surface roughness, but also it does not have coarse protrusions of 1 $\mu$m or more. The nonmagnetic support has a thickness of from 4 to 15 $\mu$m, and preferably from 4 to 9 $\mu$m. In the case where the nonmagnetic support is thin, since unevennesses of the back coating layer are liable to be taken by handling tension, it is possible to effectively suppress such a phenomenon from occurrence by using the above-described polyurethane resin in the uppermost layer. In the case where the thickness is not more than 7 $\mu$m, it is preferred to use PEN or aromatic polyamides such as aramid. Of these is the most preferable aramid.

The magnetic recording tape of the invention can be, for example, produced by vapor depositing or coating a coating material on the surface of a nonmagnetic support under running such that the thickness after drying falls within the above-specified prescribed range. A plurality of magnetic coating materials or nonmagnetic coating materials may be subjected to multilayer coating successively or simultaneously. Examples of coating machines for coating a magnetic coating layer include air doctor coaters, blade coaters, rod coaters, extrusion coaters, air knife coaters, squeeze coaters, dip coaters, reverse roll coaters, transfer roll coaters, gravure coaters, kiss coaters, cast coaters, spray coaters, and spin coaters. These can be referred to, for example, *The Latest Coating Technologies*, published by Sogo Gijutsu Center (May 31, 1983). When magnetic recording tapes having two or more layers on one surface thereof are produced, for example, the following methods can be employed.

(1) A method in which a lower layer is first coated by a coating machine that is generally applied in coating of magnetic coating materials, such as gravure coaters, roll coaters, blade coaters, and extrusion coaters, and before the lower layer is dried, an upper layer is coated by a support-pressurized extrusion coating apparatus as disclosed in JP-B-1-46186, JP-A-60-238179, and JP-A-2-265672.

(2) A method in which upper and lower layers are coated substantially simultaneously using one coating head having two coating material-passing slits as disclosed in JP-A-63-88080, JP-A-2-17971, and JP-A-2-265672.

(3) A method in which upper and lower layers are coated substantially simultaneously using a back up roll-equipped extrusion coating apparatus as disclosed in JP-A-2-174965.

The back coating layer can be prepared by coating a back coating layer-forming coating material having particulate components (such as abrasives and antistatics) and a binder dispersed in an organic solvent on the surface of the support opposite to the magnetic layer. In the foregoing preferred embodiment, when the inorganic oxide powder is used in an amount higher than that of carbon black, sufficient dispersibility can be ensured, and therefore, the back coating layer-forming coating material can be prepared without undergoing roll kneading that has hitherto been considered necessary. Further, when the content of carbon black is low, even by using cyclohexanone as a solvent, the amount of residual cyclohexanone after drying can be reduced. The coated magnetic layer is dried after magnetic field orientation treatment of the ferromagnetic powder contained in the magnetic layer. The magnetic field orientation treatment can be properly carried out by well-known methods to those skilled in the art. After drying, the magnetic layer is subjected to surface smoothening treatment using a supercalender roll. By the surface smoothening treatment, voids generated by removal of the solvent during drying disappear, whereby a filling factor of the ferromagnetic powder in the magnetic layer is enhanced. For this reason, magnetic recording tapes having high electromagnetic conversion characteristics can be obtained. As the roll for calender treatment, heat resistant plastic rolls made of, for example, epoxy resins, polyimides, polyamides, or polyamide-imides are used. Further, the treatment can be carried out using metal rolls.

Preferably, the magnetic recording medium of the invention has a surface having food smoothness. For making the smoothness good, for example, it is effective to subject a magnetic layer formed using a specific binder as described above to the calender treatment. The calender treatment is carried out at a calender roll temperature of from 60 to 100° C., preferably from 70 to 100° C., and particularly preferably from 80 to 100° C. under a pressure of usually from 100 to 500 kg/cm (from 98 to 490 kA/m), preferably from 200 to 450 kg/cm (from 196 to 441 kA/m), and particularly preferably from 300 to 400 kg/m (from 294 to 392 kA/m). The resulting magnetic recording tape is cut into a desired size using a cutter and then provided for use. It is general to heat treat the magnetic recording tape obtained through the calender treatment. Recently, for linearity of high density magnetic recording tapes (for ensuring off-track margin), it is of great importance to reduce a heat shrinkage factor. Especially, following narrow tracking, it is required to control a shrinkage factor in the MD direction (mechanical direction) to not more than 0.07% in use environments. Examples of means for reducing a heat shrinkage factor include a method in which the magnetic recording tape is heat treated in a web form while handling at a low tension and a method in which the magnetic recording tape is heat treated in a laminated state such as a bulk state or the case where the tape is incorporated in a cassette (thermo-treatment). In the former case, though there is low possibility that unevennesses of the back coating layer are taken, the heat shrinkage factor cannot be reduced. In this case, the lower limit of the heat shrinkage factor after 48 hours at 70° C. is 0.1 to 0.12%, which, however, somewhat varies by annealing temperature, retention time, tape thickness, and handling tension. In the thermo-treatment of the latter case, though the heat shrinkage factor can be greatly improved, since unevennesses of the back coating layer are considerably taken, the magnetic layer causes surface dry spots, whereby a reduction in output and an increase in noise are likely caused.

When the construction of the magnetic recording tape of the invention is employed, it is possible to undergo layer formation with high elastic modulus and less plastic deformation. Therefore, especially in magnetic recording tape following thermo-treatment, it is possible to provide magnetic recording tapes of high output and low noise. In the magnetic recording tape of the invention, since the surface of the back coating layer can be smoothened, it is possible to set up a friction coefficient of the back coating layer at a proper value. Thus, since an interlaminar friction coefficient between the back coating layer and the magnetic layer becomes high, even when high-speed handling is performed during preparation of magnetic recording tape, winding appearance of tape wound up by a roll, a slit pan cake and a built-in reel is good. Similarly, winding appearance of tape on a reel after quick traverse or rewind of video cassette recorder is also good.

EXAMPLES

The invention will be described below in detail with reference to the following Examples, but it should not be construed that the invention is limited thereto. In the Examples, all parts are parts by weight, unless otherwise indicated.

Magnetic coating material 1 (ferromagnetic metal powder)

| | |
|---|---|
| Ferromagnetic acicular metal powder: Hc: 2,300 Oe (184 kA/m), crystallite size: 120 angstroms, mean long axis length: 0.06 $\mu$m, $S_{BET}$: 70 m$^2$/g | 100 parts |
| Resin A for the invention: | 18 parts |
| Phenylphosphonic acid: | 5 parts |
| $\alpha$-Al$_2$O$_3$ (mean particle size: 0.2 $\mu$m): | 10 parts |
| Carbon black (mean particle size: 20 nm): | 1 part |
| Cyclohexanone: | 110 parts |
| Methyl ethyl ketone: | 100 parts |
| Toluene: | 100 parts |
| Butyl stearate: | 2 parts |
| Stearic acid: | 1 part |

Magnetic coating material 2 (hexagonal ferrite powder)

| | |
|---|---|
| Barium ferrite magnetic powder: Hc, tabular diameter: 2,500 Oe, 0.03 $\mu$m | 100 parts |
| Resin A for the invention: | 12 parts |
| $\alpha$-Al$_2$O$_3$ (mean particle size: 0.2 $\mu$m): | 7 parts |
| Carbon black (mean particle size: 20 nm): | 1 part |
| Butyl stearate: | 1 part |
| Stearic acid: | 2 parts |
| Methyl ethyl ketone: | 125 parts |
| Cyclohexanone: | 125 parts |

Coating material for lower layer

| | |
|---|---|
| Nonmagnetic inorganic powder: $\alpha$-iron oxide: Mean long axis length: 0.15 $\mu$m, mean acicular ratio: 7, $S_{BET}$: 52 m$^2$/g | 85 parts |
| Carbon black: Mean particle size: 20 nm | 15 parts |
| Vinyl chloride copolymer: (MR110, manufactured by Zeon Corporation) | 13 parts |
| Polyurethane resin: (UR8200: sulfonic acid group-containing polyurethane resin, manufactured by Toyobo Co., Ltd.) | 6 parts |
| Phenylphosphonic acid: | 3 parts |
| $\alpha$-Al$_2$O$_3$ (mean particle size: 0.2 $\mu$m): | 1 part |
| Cyclohexanone: | 140 parts |
| Methyl ethyl ketone: | 170 parts |
| Butyl stearate: | 2 parts |
| Stearic acid: | 1 part |

Coating material 1 for back coating layer

| | |
|---|---|
| Nonmagnetic inorganic powder: $\alpha$-iron oxide: Mean long axis length: 0.15 $\mu$m, mean acicular ratio: 7, $S_{BET}$: 52 m$^2$/g | 80 parts |
| Carbon black: Mean particle size: 20 nm | 20 parts |
| Carbon black: Mean particle size: 100 nm | 3 parts |
| Vinyl chloride copolymer: (MR110, manufactured by Zeon Corporation) | 13 parts |
| Polyurethane resin: (UR8200: sulfonic acid group-containing polyurethane resin, manufactured by Toyobo Co., Ltd.) | 6 parts |
| Phenylphosphonic acid: | 3 parts |
| $\alpha$-Al$_2$O$_3$ (mean particle size: 0.2 $\mu$m): | 3 parts |
| Cyclohexanone: | 140 parts |
| Methyl ethyl ketone: | 170 parts |
| Stearic acid: | 3 parts |

Coating material 2 for back coating layer

| | |
|---|---|
| Nonmagnetic inorganic powder: titanium oxide, crystalline rutile: Mean particle size: 0.035 $\mu$m, $S_{BET}$: 40 m$^2$/g | 80 parts |
| Carbon black: Mean particle size: 20 nm | 20 parts |
| Carbon black: Mean particle size: 100 nm | 3 parts |
| Vinyl chloride copolymer: | 13 parts |

-continued

| | |
|---|---|
| (MR110, manufactured by Zeon Corporation) | |
| Polyurethane resin: | 6 parts |
| (UR8200: sulfonic acid group-containing polyurethane resin, manufactured by Toyobo Co., Ltd.) | |
| Phenylphosphonic acid: | 3 parts |
| α-Al$_2$O$_3$ (mean particle size: 0.2 μm): | 3 parts |
| Cyclohexanone: | 140 parts |
| Methyl ethyl ketone: | 170 parts |
| Stearic acid: | 3 parts |

With respect to each of the coating material for magnetic layer, the coating material for lower layer and the coating material for back coating layer, the respective components were kneaded in an open kneader for 60 minutes and then dispersed in a sand mill for 240 minutes. To each of the resulting dispersions, a trifunctional low-molecular polyisocyanate compound was added in an amount of 3 parts for the coating material for magnetic layer, 5 parts for the coating material for lower layer and 5 parts by weight for the coating material for back coating layer, respectively. Further, 40 parts of cyclohexanone was added to each of the mixtures, followed by filtration through a filter having a mean pore size of 1 μm. There were thus prepared a coating solution for magnetic layer, a coating solution for lower layer and a coating solution for back coating layer.

On an aramid support having a thickness of 3.6 μm and a center line average surface roughness of 2 nm, the coating solution for nonmagnetic layer and the coating solution for magnetic layer were subjected to simultaneous multilayer coating such that the lower layer had a thickness after drying of 1.2 μm and the magnetic layer to be provided on the lower layer had a thickness of 0.1 μm. The laminate was oriented using a magnet having a magnetic force of 0.3 T in a state where the both layers were still wet. After drying, the resulting laminate was subjected to surface smoothening treatment at a temperature of 90° C. using a 7-stage calender composed only of metal rolls at a rate of 100 m/min and a linear pressure of 300 kg/cm (294 kN/m). Thereafter, a back coating layer having a thickness of 0.5 μm was coated. Subsequently, the laminate was slit into a width of ¼ inch and subjected to cleaning of the surface of magnetic layer using a tape cleaning unit installed in an apparatus equipped with a device for delivery and winding of slit product such that the magnetic tape came into press contact with a non-woven fabric and a razor blade.

Examples 1, 2, 3 and 4

Magnetic tapes were prepared by changing the coating material for magnetic layer and the coating material for back coating layer and amounts thereof as shown in Table 1.

Example 5

A magnetic tape of Example 5 was prepared in the same manner as in Example 1, except for changing the thickness of the back coating layer to 0.7 μm.

Example 6

A magnetic tape of Example 6 was prepared in the same manner as in Example 1, except for changing the addition amount of butyl stearate in the lower layer to 4 parts and changing the calender treatment temperature to 80° C.

Example 7

A magnetic tape of Example 7 was prepared in the same manner as in Example 1, except for adding 2 parts of butyl stearate to the coating material 1 for back coating layer and changing the calender treatment temperature to 80° C.

Example 8

A magnetic tape of Example 8 was prepared in the same manner as in Example 3, except for adding 1 part of butyl stearate to the coating material 2 for back coating layer and changing the thickness of the back coating layer to 0.8 μm.

Examples 9 and 10 and Comparative Examples 6 and 7

Magnetic tapes of Examples 9 and 10 and Comparative Examples 6 and 7 were prepared in the same manner as in Example 1, except for changing the addition amounts of the vinyl chloride copolymer, urethane resin and polyisocyanate compound in the coating material 1 for back coating layer as shown in Table 1 while keeping the addition ratios thereof constant.

Comparative Example 1

A magnetic tape of Comparative Example 1 was prepared in the same manner as in Example 7, except for changing the addition amount of butyl stearate in the lower layer to 3 parts.

Comparative Example 2

A magnetic tape of Comparative Example 2 was prepared in the same manner as in Example 8, except for changing the thickness of the back coating layer to 1.0 μm.

Comparative Example 3

A magnetic tape of Comparative Example 3 was prepared in the same manner as in Example 1, except for changing the addition amount of stearic acid in the lower layer to 0.5 parts and changing the addition amount of stearic acid in the coating material 1 for back coating layer to 1 part.

Comparative Example 4

A magnetic tape of Comparative Example 4 was prepared in the same manner as in Example 1, except for changing the butyl stearate in the coating material for lower layer to isoamyl stearate.

Comparative Example 5

A magnetic tape of Comparative Example 5 was prepared in the same manner as in Example 4, except that the butyl stearate in the magnetic coating material 2 was not added.

Comparative Example 8

A magnetic tape of Comparative Example 8 was prepared in the same manner as in Example 1, except for changing the coating material for back coating layer to one described below.
Coating Material 3 for Back Coating Layer:
(Dispersion) The following composition was charged in a ball mill and dispersed for 24 hours.

| | |
|---|---|
| Carbon black 1: | 80 parts |
| (Conductex SC, manufactured by Columbia Carbon Company; mean particle size = 20 nm, S$_{BET}$ = 220 m$^2$/g) | |
| Carbon black 2: | 5 parts |

-continued

| | |
|---|---|
| (Sevacarb MT, manufactured by Columbia Carbon Company; mean particle size = 350 nm, $S_{BET}$ = 8 m²/g) | |
| α-Fe₂O₃: | 1 part |
| (TF100, manufactured by Toda Kogyo Corp.; mean particle size = 0.1 μm) | |
| Nitrocellulose resin: | 65 parts |
| Polyester polyurethane resin: | 35 parts |
| (UR-8300, manufactured Toyobo Co., Ltd.) | |
| MEK: | 260 parts |
| Toluene: | 260 parts |
| Cyclohexanone: | 260 parts |

The dispersed slurry was mixed with following composition and stirred, and the mixture was again dispersed in a ball mill for 3 hours.

| | |
|---|---|
| Stearic acid: | 1 part |
| Butyl stearate: | 2 parts |
| MEK: | 210 parts |
| Toluene: | 210 parts |
| Cyclohexanone: | 210 parts |

To 100 parts of the coating material after filtration, 1 part of an isocyanate compound (Coronate L, manufactured by Nippon Polyurethane Industry Co., Ltd.) was added, and then stirred and mixed to prepare a coating material for back coating layer.

The performance of the obtained magnetic tape samples were evaluated in the following manners, and the results are shown in Table 1.

[Measurement Methods]

1. Electromagnetic Conversion Characteristics:

The measurement of electromagnetic conversion characteristics was carried out using a drum tester. That is, using an MIG head of 1.5 T, signals having a recording wavelength of 0.4 μm were recorded and reproduced by an MR head. A C/N value was determined from an output obtained by a spectrum analyzer and a voltage as a noise at the position of ±0.5 MHz far from the output. A relative speed between the tape and the head was 5.1 m/s. The C/N value in Comparative Example 1 was defined 0 dB, and values higher than 0 dB were considered good.

2. Friction Coefficient of Tape:

The measurement of friction coefficient was carried out in a manner in which the tape was wrapped around a SUS420 J rod of 6 mmφ (roughness: 0.6 s) at 180° and run at a desired number of paths under a load of 20 g in an environment at 23° C. and 70% RH. A tension when tensing the tape was measured, and the friction coefficient was calculated according to the Euler's equation.

The friction coefficient in the magnetic layer side (Mag plane) was determined at the 1-st path and the 100-th path, and the friction coefficient in the back coating layer side was determined at the 1-st path and the 400-th path, respectively as an index of durability. Values of not more than 0.35 are considered good.

3. Measurement of Surface Lubricant Index:

Two pairs (one for magnetic layer and the other for back coating layer) obtained by dividing a sample into two portions were prepared. One portion (a) was used as it was, and the other portion (b) was used after removing the lubricant component in the following manner. The both were introduced into an Auger electron spectrometer (PHI-660 Model, manufactured by PHI Inc., U.S.A) and integrated three times within the range of kinetic energy of from 130 to 730 eV under the conditions (primary electron beam acceleration voltage: 3 kV, sample current: 130 nA, magnification: 250 times, tilt angle: 30°). Then, intensity of carbon (C) peak and intensity of iron (Fe) or intensity of titanium (Ti) were determined in terms of differential form to take a C/Fe or C/Ti ratio, from which was calculated an intensity ratio of (a) to (b) (for example, c/Fe (a)/C/Fe (b)) as a surface lubricant index.

Removal of Lubricant Component:

The sample (10 mm×30 mm) was dipped in n-hexane at normal temperature for 30 minutes, and unadsorbed fatty acids and fatty acid esters were extracted and removed. Next, the sample was placed in a bottle, to which were then added 10 mL of n-hexane and 0.3 mL of a silylating agent, TMSI-H (a mixture of HMDS (hexamethyldisilazane), TMCS (trimethylchlorosilane) and pyridine in a volume ratio of 2/1/10) as a derivative reagent. The mixture was subjected to heat derivative reaction at 60° C. for 1 hour. The sample was then taken out, rinsed with ethanol, and then dried to remove the lubricant component.

TABLE 1

| | Coating material for magnetic layer | Coating material for back coating material | Addition amount of resin in back coating layer | Thickness of back coating layer [μm] | Surface lubricant index of magnetic layer |
|---|---|---|---|---|---|
| Example 1 | 1 | 1 | 24 | 0.4 | 1.5 |
| Example 2 | 2 | 1 | 24 | 0.4 | 1.3 |
| Example 3 | 1 | 2 | 24 | 0.4 | 1.4 |
| Example 4 | 2 | 2 | 24 | 0.2 | 1.3 |
| Example 5 | 1 | 1 | 24 | 0.7 | 1.6 |
| Example 6 | 1 | 1 | 24 | 0.4 | 3.5 |
| Example 7 | 1 | 1 | 24 | 0.4 | 1.8 |
| Example 8 | 1 | 2 | 24 | 0.8 | 1.8 |
| Example 9 | 1 | 1 | 10.2 | 0.4 | 1.6 |
| Example 10 | 1 | 1 | 29.5 | 0.4 | 1.4 |
| Comparative Example 1 | 1 | 1 | 24 | 0.4 | 2.0 |
| Comparative Example 2 | 2 | 2 | 24 | 1.0 | 1.9 |
| Comparative Example 3 | 1 | 1 | 24 | 0.2 | 1.5 |
| Comparative Example 4 | 1 | 1 | 24 | 0.4 | 3.6 |
| Comparative Example 5 | 2 | 1 | 24 | 0.2 | 1.2 |
| Comparative Example 6 | 1 | 1 | 9.5 | 0.4 | 1.6 |
| Comparative Example 7 | 1 | 1 | 31.0 | 0.4 | 1.5 |
| Comparative Example 8 | 1 | 3 | — | 0.4 | 1.5 |

TABLE 1-continued

|  | Surface lubricant index of back coating layer | Electromagnetic conversion characteristics Near C/N | Friction coefficient of Mag plane 1 p/100 p | Friction coefficient of back coating layer surface 1 p/400 p |
|---|---|---|---|---|
| Example 1 | 1.1 | 1.5 | 0.28/0.31 | 0.24/0.25 |
| Example 2 | 1.1 | 1.1 | 0.24/0.26 | 0.24/0.24 |
| Example 3 | 1.8 | 1.3 | 0.27/0.29 | 0.21/0.23 |
| Example 4 | 1.4 | 1.3 | 0.23/0.25 | 0.20/0.25 |
| Example 5 | 1.3 | 0.2 | 0.31/0.29 | 0.25/0.31 |
| Example 6 | 1.8 | 0.3 | 0.33/0.29 | 0.22/0.24 |
| Example 7 | 2.9 | 0.1 | 0.31/0.31 | 0.31/0.34 |
| Example 8 | 2.8 | 1.2 | 0.27/0.29 | 0.28/0.33 |
| Example 9 | 2 | 0 | 0.30/0.27 | 0.21/0.25 |
| Example 10 | 1.1 | 0.7 | 0.30/0.34 | 0.26/0.28 |
| Comparative Example 1 | 3.2 | 1.1 | 0.28/0.35 | 0.36/Sticking |
| Comparative Example 2 | 3.1 | 1.2 | 0.26/0.29 | 0.41/0.55 |
| Comparative Example 3 | 1.05 | 0.5 | 0.28/0.31 | 0.24/0.43 |
| Comparative Example 4 | 2.2 | 1.7 | 0.38/Sticking | 0.24/0.33 |
| Comparative Example 5 | 1.5 | 1.2 | 0.25/038 | 0.22/0.24 |
| Comparative Example 6 | 1.4 | −0.9 | 0.29/0.34 | 0.25/0.5 |
| Comparative Example 7 | 1.2 | 0.2 | 0.27/0.31 | 0.31/0.65 |
| Comparative Example 8 | — | −2.9 | 0.29/0.34 | 0.18/0.48 |

It can be noted from the foregoing table that the Examples of the invention suppress a reduction in C/N and do not cause sticking of magnetic tape by suppressing reverse taking into the magnetic layer and have excellent running durability by suppressing an increase in friction coefficient by running, as compared with the Comparative Examples.

The invention can provide a magnetic recording medium having excellent electromagnetic conversion characteristics and running durability by using a specific powder composition and a specific amount of a lubricant in a back coating layer and specifying a surface lubricant index of each of the back coating layer and magnetic layer, thereby preventing reverse taking of the back coating layer into the magnetic layer and effectively exhibiting a function of the lubricant.

This application is based on Japanese Patent application JP 2002-157513, filed May 30, 2002, the entire content of which is hereby incorporated by reference, the same as if set forth at length.

What is claimed is:

1. A magnetic recording tape comprising:
a magnetic layer comprising a ferromagnetic powder and a binder;
a nonmagnetic layer;
a support; and
a back coating layer, in this order,
wherein the magnetic layer has a surface lubricant index of from 1.3 to 3.5, the back coating layer comprises titanium oxide, α-iron oxide or a mixture thereof as an inorganic oxide powder and carbon black and further comprises from 10 to 30 parts by weight, based on 100 parts by weight of a total amount of the inorganic oxide powder and the carbon black, of a binder, and the back coating layer has a surface lubricant index of from 1.10 to 3.0,
the magnetic layer and the back coating layer each further comprises a lubricant, and
the magnetic layer comprises the lubricant in an amount of from 3 to 8 parts by weight, based on 100 parts by weight of the ferromagnetic powder.

2. The magnetic recording tape according to claim 1, wherein the back coating layer has a thickness of from 0.2 to 0.8 μm.

3. The magnetic recording tape according to claim 1, wherein the magnetic layer has a surface lubricant index of from 1.35 to 2.0.

4. The magnetic recording tape according to claim 1, wherein the magnetic layer comprises a lubricant in an amount of from 3 to 5 parts by weight, based on 100 parts by weight of the ferromagnetic powder.

5. The magnetic recording tape according to claim 1, wherein at least a part of a surface of the inorganic oxide powder is coated with at least one compound selected from $Al_2O_3$, $SiO_2$, $TiO_2$, $ZrO_2$, $SnO_2$, $Sb_2O_3$ and $ZnO_2$.

6. The magnetic recording tape according to claim 1, wherein at least a part of a surface of the inorganic oxide powder is coated with at least one compound selected from $Al_2O_3$, $SiO_2$ and $ZrO_2$.

7. The magnetic recording tape according to claim 1, wherein the carbon black has a particle size of not more than 0.3 μm.

8. The magnetic recording tape according to claim 1, wherein the carbon black has a particle size of from 0.01 to 0.1 μm.

9. The magnetic recording tape according to claim 1, wherein the carbon black has a pH of from 2 to 10.

10. The magnetic recording tape according to claim 1, wherein a weight ratio of the inorganic oxide powder to the carbon black is from 60/40 to 90/10.

11. The magnetic recording tape according to claim 1, wherein a weight ratio of the inorganic oxide powder to the carbon black is from 70/30 to 80/20.

12. The magnetic recording tape according to claim 1, wherein the back coating layer has a glass transition temperature of from 60 to 120° C.

13. The magnetic recording tape according to claim 1, wherein the ferromagnetic powder has a long axis length of from 0.04 to 0.08 μm.

14. The magnetic recording tape according to claim 1, wherein the ferromagnetic powder has a long axis length of from 0.04 to 0,06 μm.

* * * * *